United States Patent

(12) United States Patent
Nestler

(10) Patent No.: US 10,199,182 B1
(45) Date of Patent: Feb. 5, 2019

(54) SWITCH, IN PARTICULAR LOW-VOLTAGE CIRCUIT BREAKER, IN PLUG-IN TECHNOLOGY WITH AUTOMATIC UNLOADING OF THE FORCE STORE DURING WITHDRAWAL

(71) Applicant: Siemens Aktiengesellschaft, Munich (DE)

(72) Inventor: Johannes Nestler, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/798,628

(22) Filed: Oct. 31, 2017

(51) Int. Cl.
*H01H 9/20* (2006.01)
*H01H 3/42* (2006.01)
*H01H 3/36* (2006.01)
*H01H 3/46* (2006.01)

(52) U.S. Cl.
CPC ............... *H01H 9/20* (2013.01); *H01H 3/36* (2013.01); *H01H 3/42* (2013.01); *H01H 3/46* (2013.01); *H01H 2235/01* (2013.01)

(58) Field of Classification Search
CPC .. H01H 9/20; H01H 3/36; H01H 3/42; H01H 3/46; H01H 2235/01; H01H 3/3031
USPC ............ 200/318, 400, 401, 50.21, 50.24
See application file for complete search history.

(56) References Cited

U.S. PATENT DOCUMENTS

| 2004/0144629 A1 | 7/2004 | Dahl et al. |
| 2004/0262134 A1 | 12/2004 | Banghard et al. |
| 2005/0006211 A1 | 1/2005 | Anger et al. |
| 2010/0155210 A1* | 6/2010 | Godesa ................ H01H 3/3005 200/400 |
| 2010/0326810 A1* | 12/2010 | Song ........................ H01H 3/42 200/574 |
| 2013/0307647 A1* | 11/2013 | Marushima .......... H01H 3/3015 335/15 |

FOREIGN PATENT DOCUMENTS

| DE | 100 10 727 C2 | 3/2002 |
| DE | 100 65 090 C1 | 3/2002 |
| DE | 101 20 783 C1 | 11/2002 |
| DE | 101 53 108 C1 | 11/2003 |
| DE | 10 2004 021 455 A1 | 12/2004 |
| EP | 0 048 042 A2 | 3/1982 |

* cited by examiner

*Primary Examiner* — Edwin A. Leon
(74) *Attorney, Agent, or Firm* — Harness, Dickey & Pierce, P.L.C.

(57) ABSTRACT

A switch, in particular a low-voltage circuit breaker, in plug-in technology includes a withdrawal shaft to move the switch from an operating position into a removal position; a force store including a storage spring unloaded during withdrawal; and an unlatching shaft which, as the circuit breaker is withdrawn, is configured to rotate into an unlatching position, unloading of the storage spring taking place when the unlatching shaft is in the unlatching position. To permit unloading of the force store during the withdrawal, the unlatching shaft includes a driver element, spaced radially apart from its axis of rotation and configured to rest in a sliding manner on an outer contour of a rotatably mounted cam disk. The withdrawal shaft and the cam disk are connected via a connecting element which transforms the rotation of the withdrawal shaft into a corresponding rotation of the cam disk and therefore, of the unlatching shaft.

17 Claims, 6 Drawing Sheets

SWITCH, IN PARTICULAR LOW-VOLTAGE CIRCUIT BREAKER, IN PLUG-IN TECHNOLOGY WITH AUTOMATIC UNLOADING OF THE FORCE STORE DURING WITHDRAWAL

FIELD

At least one embodiment of the invention generally relates to a switch, in particular a low-voltage circuit breaker, in plug-in technology with automatic unloading of the force store during withdrawal of the switch.

BACKGROUND

Electric switches of a switching system in the form of low-voltage circuit breakers in plug-in technology are known. The circuit breakers can be moved in and out in a plug-in frame of a switch cabinet and have a switching contact system with a contact arrangement and an arc quenching chamber. The contact arrangement has a stationary and a moving switch contact, which can be moved by a drive mechanism to close and open the switch. The drive mechanism includes a drive device for a switching shaft which, to close and open the switch contacts, can be rotated from an off position to an on position and vice versa. In the off position, the switch contacts are isolated from each other, and in the on position the switch contacts rest on each another. The drive device further comprises a spring of a force store and a switching lock with a latching mechanism for latching the loaded spring, wherein the force store provides the energy to close the contacts.

The circuit breaker is withdrawn out of its operating position into its removal position by a movement drive which has a withdrawal shaft.

For occupational safety reasons, the spring store of the switching lock must be unloaded during the removal of the circuit breaker from the plug-in frame, for example for maintenance purposes.

Therefore, the spring of the spring store is automatically unloaded during the withdrawal into its removal position, as is already known from DE 101 53 108 C1, DE 100 65 090 C1 and EP 0 048 042. The interaction of switching lock, latch and spring store of a low-voltage circuit breaker is known from DE 100 10 727 C2 and DE 101 20 783 C1.

In addition, a specific mechanism for unloading the spring of the spring store during withdrawal is known from DE 10 2004 021 455 A1. The mechanism unloads the spring store on the basis of the revolutions of the withdrawal shaft at a defined location of the movement travel between a test position and the removal position. This is carried out as a so-called empty switching action by unlatching the latching mechanism via a latch, in particular the switch-on latch, which functions as a "triggered latch". The latch is released by a latching shaft after the latching shaft has been moved by the withdrawal shaft into its unlatching position.

The mechanism known from DE 10 2004 021 455 A1 comprises a linkage which is constructed as a linear slider and converts the rotational travel covered by the withdrawal shaft into a linear movement. This movement in turn rotates an unlatching shaft, which releases the latch when it reaches its unlatching position, so that the latch of the latching mechanism can unlatch and the storage spring is unloaded.

The linkage includes a bending element, which resets the linear slider via a tension spring following the rotation of the unlatching shaft. As a result, the unlatching shaft is released again following the unloading and the storage spring can be loaded again.

SUMMARY

At least one embodiment of the invention resides in specifying a low-voltage circuit breaker with automatic unloading of the force store during the withdrawal into its removal position which needs fewer individual parts, wherein in addition considerably fewer sheet metal parts that are simpler in terms of production technology and fewer riveting points are to be required.

The claims constitute advantageous refinements.

At least one embodiment of the invention provides for the unlatching shaft to have a driver element which is spaced radially apart from its axis of rotation and which rests in a sliding manner on the outer contour of a rotatably mounted cam disk, and for the withdrawal shaft and the cam disk to be connected to each other via a connecting element which transforms the rotation of the withdrawal shaft into a corresponding rotation of the cam disk and therefore of the unlatching shaft. The individual parts can be fabricated simply and universally, and no more bent sheet metal parts are required. As a result, part and assembly costs are reduced. Time and therefore costs are saved when retrofitting the switch.

It is technically simple if the driver element is formed as a cam (driver cam).

In a simple embodiment, the connecting element is formed as a pulling element.

The pulling element is expediently formed as a pull cord.

For simple, proper functioning, the outer contour of the cam disk has an increase in the radial distance from the axis of rotation.

The greatest radial distance should be at least so large that the unlatching shaft rotates (as far as) into the unlatching position (a rotation of the unlatching shaft into the unlatching position takes place).

Advantageously present is a half-shaft, which rotates the unlatching shaft during rotation into its unlatching position into a triggering position, in which it enables unloading of the storage spring.

Expediently, in the triggering position, the half-shaft releases the pivoting movement of a latch (in particular that of the switch-on latch) into its triggering position, which triggers the unloading of the storage spring.

It is technically simple if the cam disk is rotatable about an axis which extends substantially parallel to the axis of rotation of the unlatching shaft.

In order to restore the ability to be loaded, as seen in the counterclockwise direction in the circumferential direction, following the increase in the radial distance, the outer contour of the cam disk has a reduction in the radial distance from the axis of rotation, in order to release the latch again and to permit the storage spring to be loaded.

At least one embodiment of the invention therefore uses the rotational movement of the withdrawal shaft in order to release the latch via the unlatching shaft, which is actuated via a cam disk. The cam disk is connected to the withdrawal shaft via a pulling element (e.g. a plastic cord), directly or via one or more deflection elements. As the switch is moved into the insertion frame, the cam disk is brought back into the initial position by a restoring element (e.g. a torsion spring).

DETAILED DESCRIPTION OF THE EXAMPLE EMBODIMENTS

Figure 1:
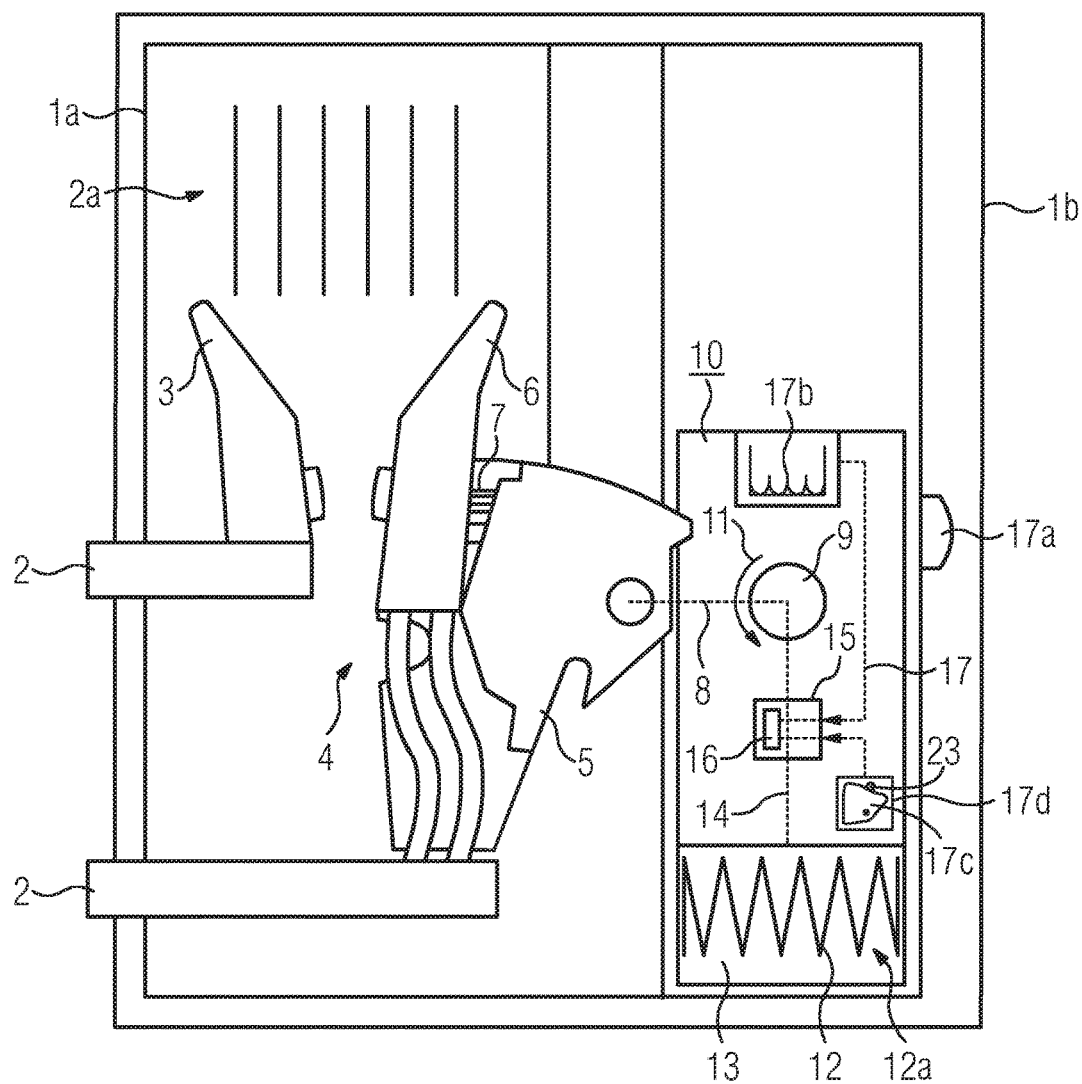
FIG. 1 shows a schematic illustration of an electric switch in the form of a low-voltage circuit breaker.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

FIG. 1 shows a schematic illustration of an electric switch 1a in the form of a low-voltage circuit breaker, which can be moved in and out in an insertion frame 1b in a switching system and has a housing through which connecting bars 2 extend outward. In the switch 1a there is a switch contact system having a switch contact arrangement and an associated arc quenching chamber 2a. The switch contact arrangement comprises a stationary switch contact 3 and a movable switch contact 4.

The movable switch contact 4 has a pivotable contact carrier 5 and a movable contact 6 in the form of a contact lever. The movable contact 6 is supported on the contact carrier 5 such that it can be pivoted and is sprung under preload via contact force springs 7. The movable switch contact 4 is coupled, via a lever arrangement 8 indicated only schematically in FIG. 1, to a switching shaft 9 of a drive train.

The switching shaft 9 of the drive train is to be transferred via a drive device 10 from an off position, in which the switch contacts 3, 4 are isolated from each other, into an on position, in which the switch contacts 3, 4 rest on each other.

As the switching shaft 9 is rotated (transferred) into its on position, the contact force springs 7 are loaded, so that their force acts in the pivoting direction 11 of the switching shaft 9 that points toward the off position.

The drive device 10 has a drive 13 provided with a storage spring 12 of a force store 12a (here a spring store), a further lever arrangement 14 of the drive train, coupling the drive 13 to the switching shaft 9, and a switch lock 15, which includes a latching mechanism 16 and a latch 16a for unlatching. The latching mechanism 16 can be actuated via a drive train 17 by hand—via a pushbutton 17a arranged on the front of the switch—or by an electromagnet 17b.

Furthermore, for safety reasons, as the switch 1a is moved from its operating position to its removal position (withdrawn position), the latching mechanism 16 is actuated by a mechanism 17d having a cam disk 17c, in order to unload the storage spring 12.

Figure 2:
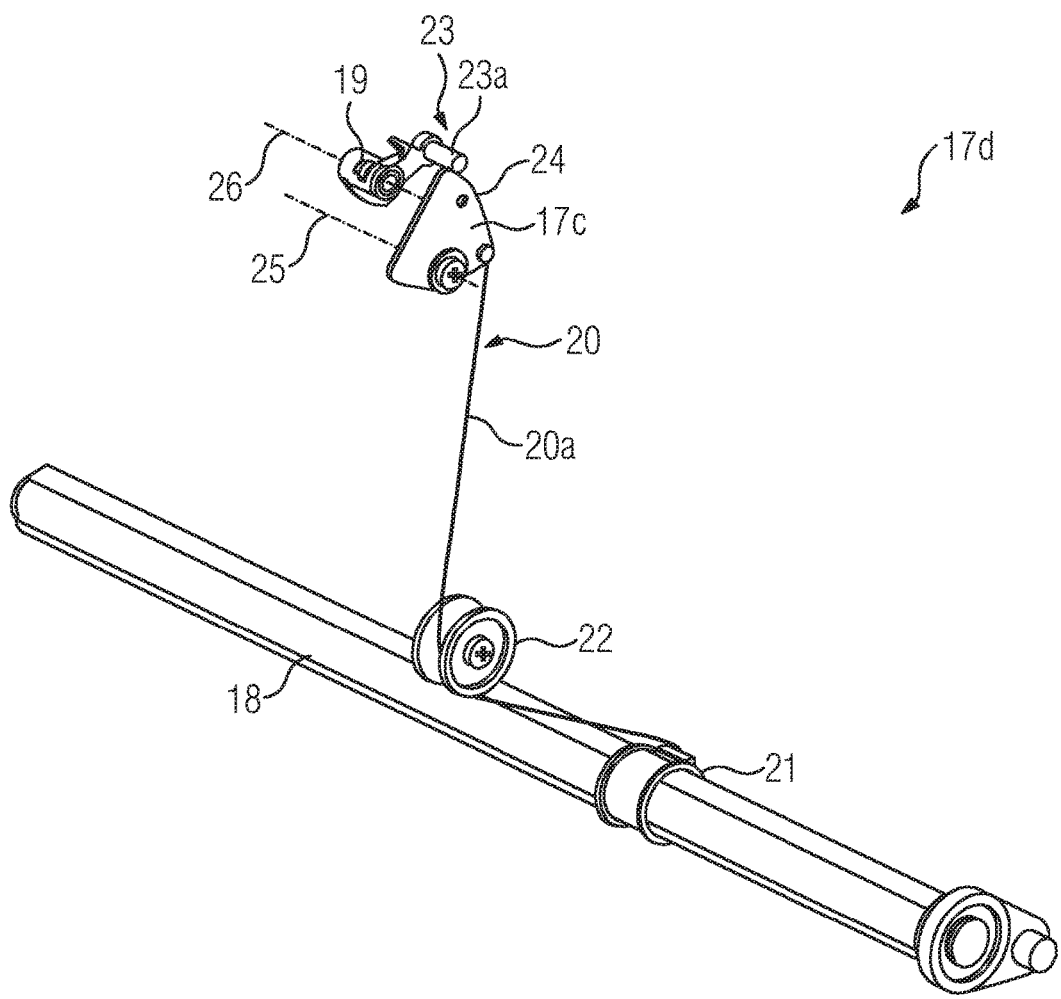
FIG. 2 shows a mechanism for unloading the storage spring as the switch is withdrawn.

FIG. 2 shows the mechanism 17d for unloading the storage spring 12 as the switch is moved out into its removal position, by transforming the rotation of a withdrawal shaft 18 into a corresponding rotation of an unlatching shaft 19 with the aid of the cam disk 17c. The rotatably mounted cam disk 17c is connected to the withdrawal shaft 18 via a pull cord 20a as connecting element 20. The pull cord 20a can be wound up and unwound over a coil former 21 seated on the withdrawal shaft 18, is led over a deflection roller 22 and is fixed to the cam disk 17c. A cam 23a (driver cam) as drive element 23 rests in a sliding manner on the outer contour 24 of the cam disk 17c. The cam 23a is accordingly spaced radially apart from the axis of rotation 26 of the unlatching shaft 19. The unlatching shaft 19 and the cam disk 17c are each in their triggering position in FIG. 2.

Figure 3:
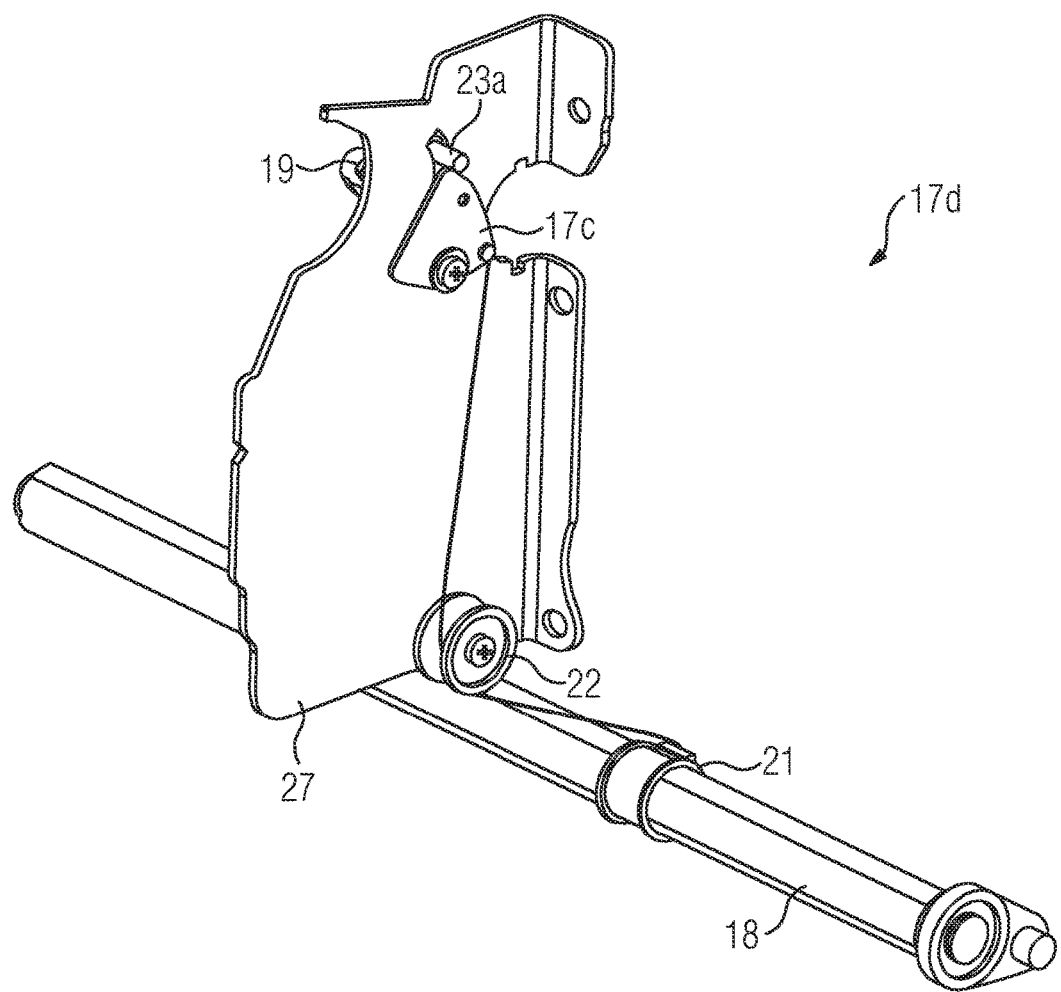
FIG. 3 shows the mechanism according to FIG. 2, arranged on an intermediate wall in the interior of the switch.

FIG. 3 shows the mechanism 17d according to FIG. 2 with a wall 27, through which the cam 23a extends, present in the interior of the switch 1a.

Figure 4:
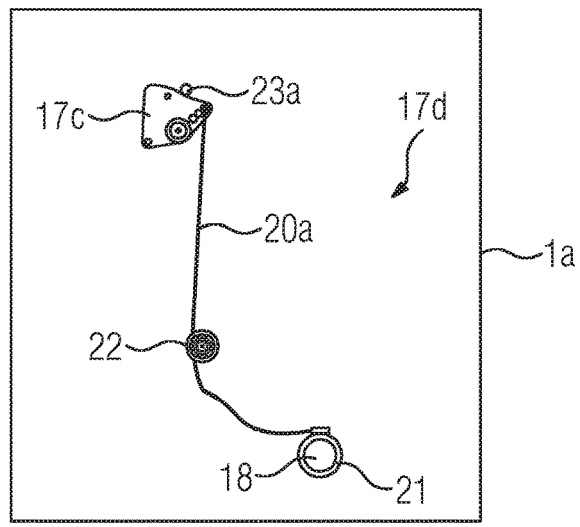
FIG. 4 shows the mechanism in a front view with cam disk located in its initial position.

FIG. 4 shows the mechanism 17d in a front view, wherein the cam disk 17c is in its initial position. The outer contour 24 of the cam disk 17c has an increase in the radial distance from the axis of rotation 25, so that a rotation of the cam disk 17c in the clockwise direction moves the cam 23a upward, the latter rotating the unlatching shaft 19 accordingly about its longitudinal axis 26 (its axis of rotation) from its initial position into its unlatching position.

Figure 5:
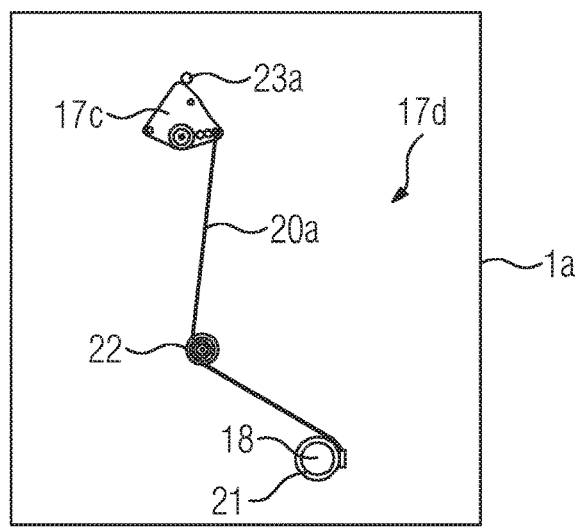
FIG. 5 shows the mechanism in a front view with cam disk rotated into its triggering position.

FIG. 5 shows the mechanism 17d according to FIG. 4 with cam 23a moved upward as a result of rotation of the cam disk 17c in the clockwise direction, and the unlatching shaft 19 in its unlatching position, as in FIG. 2 and FIG. 3.

Figure 6:
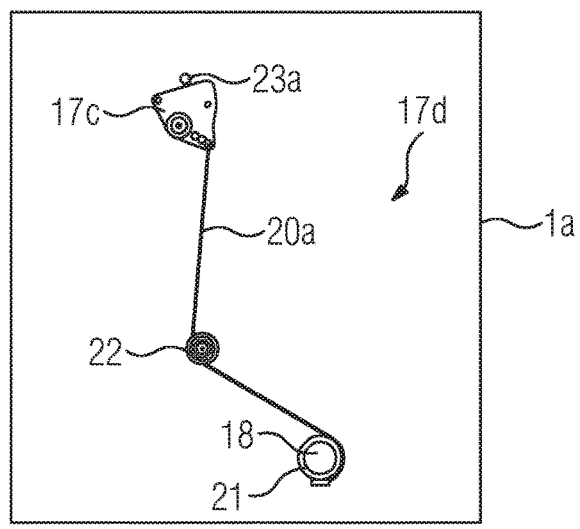
FIG. 6 shows the mechanism in a front view with cam disk rotated further.

FIG. 6 shows the mechanism 17d with cam disk 17c rotated further as compared with FIG. 5, wherein the spring-force-loaded unlatching shaft 19 again assumes its initial position, in which the storage spring 12 can be loaded again. In FIG. 6, the switch 1a is in its removal position.

Figure 7:
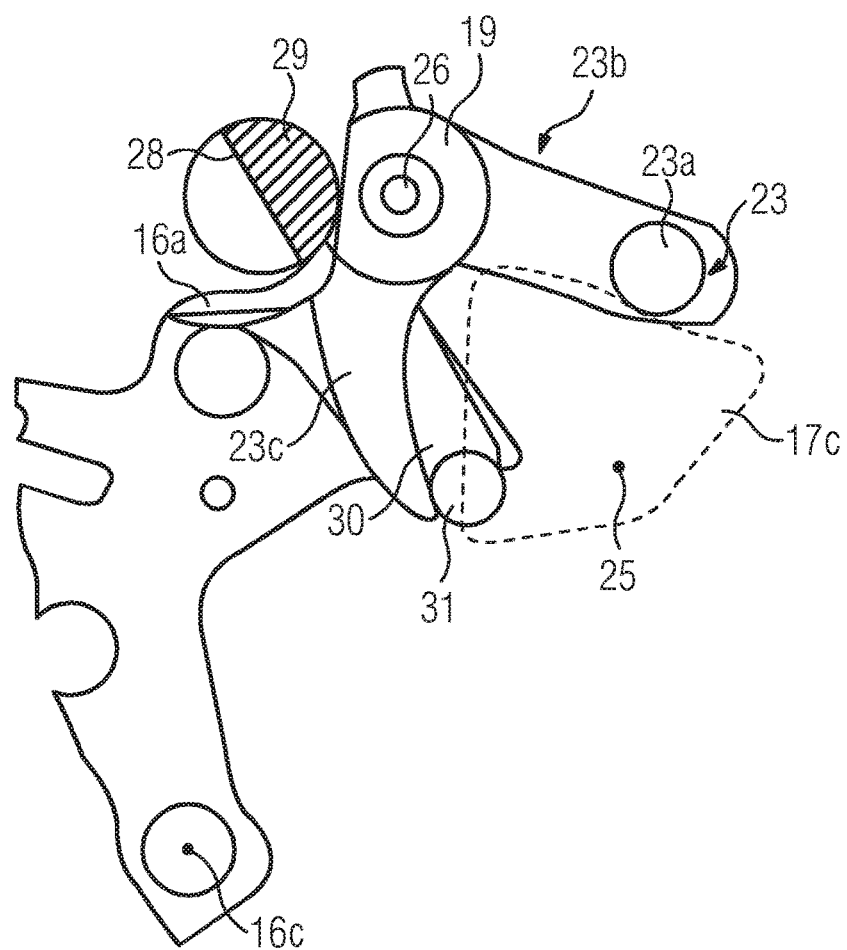
FIG. 7 shows the latch in the latched state.
Figure 8:
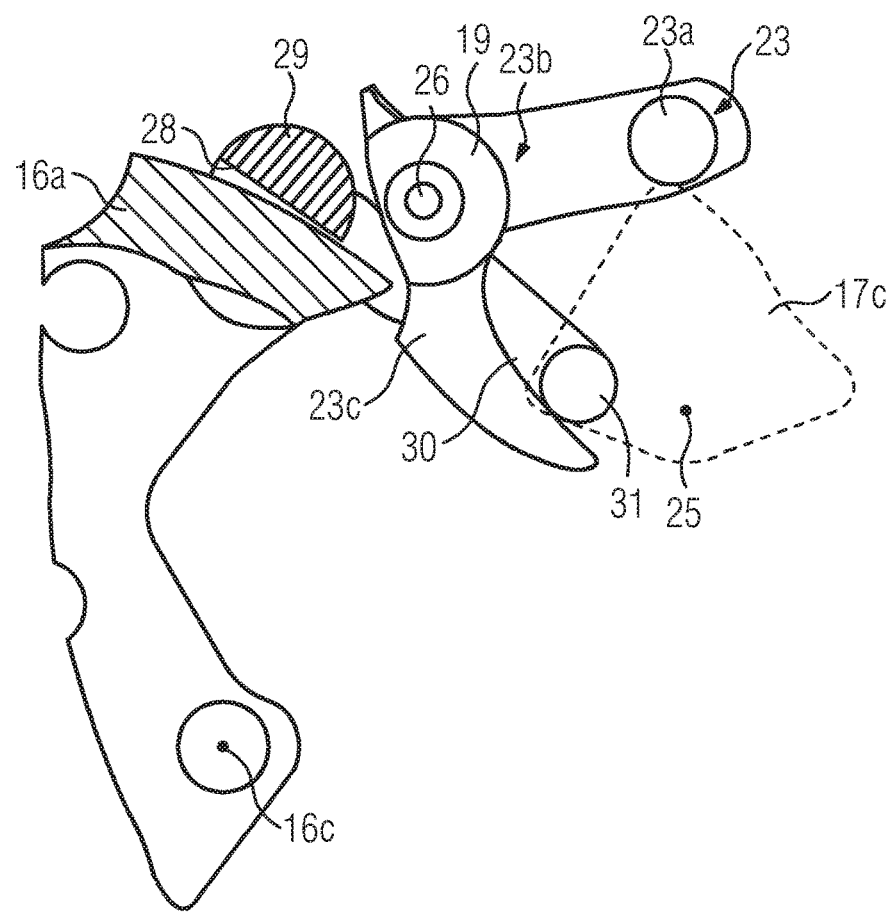
FIG. 8 shows the latch in the unlatched state.

FIGS. 7-8 show, by way of example, the interaction of the unlatching shaft 19 and the latch 16a.

FIG. 7 shows the latch 16a, which can be rotated about axis of rotation 16c, in the latched state, wherein the latch 16a rests on a stop 28 of a half-shaft 29. The half-shaft 29 and therefore the stop 28 has a driver 31 formed as a lever 30, by which the half-shaft 29 can be rotated about its axis of rotation counter to the force of a restoring spring.

The cam disk 17c (shown dashed) is connected in terms of rotation to the driver 23b via the cam 23a. The driver 23b has a lever 23c and is rotatably mounted about the axis of rotation 26.

In FIG. 7, the cam 23a is in its lower end position. Here, the lever 23c of the driver 23 does not touch the lever 30 of the half-shaft 29 via a cam 31 (or touches the same only lightly), so that the half-shaft 29 has an angular position in which the latch 16a, which is pressed against the half-shaft 29 by spring forces, is blocked.

FIG. 8 shows the cam 23a in its upper end position following appropriate rotation of the (dashed) cam disk 17c in the clockwise direction. As a result of the rotation of the cam disk 17c, the lever 23c is rotated, the lever 23c loading the lever 30 via the cam 31. As a result, the half shaft 29 is displaced into an angular position in which the latch 16a is moved past the half-shaft 29 into its unlatching position. In the unlatching position, the storage spring 12 is unloaded.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A switch for plug-in technology, comprising:
   an unlatching shaft;
   a withdrawal shaft to move the switch from an operating position into a removal position;
   a force store, including a storage spring unloaded during withdrawal, wherein, in response to a rotation of the withdrawal shaft, a corresponding rotation of the unlatching shaft is configured to occur, and in response to the switch being withdrawn, the unlatching shaft is configured to rotate into an unlatching position, and the storage spring is configured to unload in response to the unlatching shaft reaching the unlatching position,
   the unlatching shaft including a driver element spaced radially apart from an axis of rotation, the driver element being configured to rest in a slidable manner on an outer contour of a rotatably mounted cam disk, the withdrawal shaft and the rotatably mounted cam disk being connected via a connecting element, configured to transform rotation of the withdrawal shaft into a corresponding rotation of the cam disk and of the unlatching shaft.

2. The switch of claim 1, wherein the driver element is formed as a cam.

3. The switch of claim 1, wherein the connecting element is formed as a pulling element.

4. The switch of claim 3, wherein the pulling element is formed as a pull cord.

5. The switch of claim 1, wherein the outer contour of the rotatably mounted cam disc includes a relative increase in a radial distance from the axis of rotation.

6. The switch of claim 5, wherein a relatively greatest radial distance from the axis of rotation is at least so large that the unlatching shaft is configured to rotate into the unlatching position.

7. The switch of claim 1, further comprising:
   a half-shaft, configured to rotate the unlatching shaft during rotation from the unlatching position into a triggering position, to enable the storage spring to unload.

8. The switch of claim 7, wherein in the triggering position, the half-shaft is configured to release a pivoting movement of a latch into a triggering position, configured to trigger the storage spring to unload.

9. The switch of claim 1, wherein the rotatably mounted cam disc is rotatable about an axis of rotation, extending substantially parallel to the axis of rotation of the unlatching shaft.

10. The switch of claim 1, wherein, viewed in a counterclockwise direction in a circumferential direction, an subsequent to a relative increase in a radial distance, the outer contour of the rotatably mounted cam disk includes a reduction in the radial distance from the axis of rotation, to again release a latch and to permit the storage spring to be loaded.

11. The switch of claim 2, wherein the connecting element is formed as a pulling element.

12. The switch of claim 11, wherein the pulling element is formed as a pull cord.

13. The switch of claim 4, wherein the outer contour of the rotatably mounted cam disc includes a relative increase in a radial distance from the axis of rotation.

14. The switch of claim 13, wherein a relatively greatest radial distance from the axis of rotation is at least so large that the unlatching shaft is configured to rotate into the unlatching position.

15. The switch of claim 6, further comprising:
   a half-shaft, configured to rotate the unlatching shaft during rotation from the unlatching position into a triggering position, to enable the storage spring to unload.

16. The switch of claim 15, wherein in the triggering position, the half-shaft is configured to release a pivoting movement of a latch into a triggering position, configured to trigger the storage spring to unload.

17. The switch of claim 1, wherein the switch is a low-voltage circuit breaker.

* * * * *